United States Patent
Cervantes

(10) Patent No.: US 6,950,118 B2
(45) Date of Patent: Sep. 27, 2005

(54) LASER IMAGING DEVICE INCLUDING A PULSE WIDTH MODULATOR SYSTEM

(75) Inventor: Jose L. Cervantes, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 78 days.

(21) Appl. No.: 10/355,862

(22) Filed: Jan. 30, 2003

(65) Prior Publication Data

US 2004/0150711 A1 Aug. 5, 2004

(51) Int. Cl.[7] .................................................. B41J 2/47
(52) U.S. Cl. ...................................................... 347/252
(58) Field of Search ................................ 347/144, 237, 347/239, 252–255, 131, 240, 244, 247, 251; 345/89; 382/276

(56) References Cited

U.S. PATENT DOCUMENTS

| | | | |
|---|---|---|---|
| 5,023,615 A | 6/1991 | Yamada et al. ............. | 341/152 |
| 5,065,441 A | * 11/1991 | Yamamoto et al. ......... | 382/276 |
| 5,371,524 A | * 12/1994 | Herczeg et al. ............. | 347/224 |
| 5,444,728 A | 8/1995 | Thompson ............... | 372/38.02 |
| 5,764,664 A | 6/1998 | Yip et al. ..................... | 372/26 |
| 6,072,452 A | * 6/2000 | Worley et al. ................ | 345/89 |
| 6,201,560 B1 | 3/2001 | Curry ......................... | 347/240 |
| 6,236,427 B1 | 5/2001 | Roylance et al. ........... | 347/249 |
| 6,366,307 B1 | 4/2002 | Morrison .................... | 347/249 |
| 6,390,579 B1 | 5/2002 | Roylance et al. .............. | 347/9 |

* cited by examiner

Primary Examiner—Hai Pham

(57) ABSTRACT

A laser imaging device is described. The laser imaging device includes a laser driver, and a pulse width modulator system. The pulse width modulator system includes a first pulse width modulator having a first operating frequency and a second pulse width modulator having a second operating frequency, which provides to the laser driver a pulse width modulated output signal having a desired modulation frequency greater than the first and second operating frequencies.

37 Claims, 8 Drawing Sheets

| POSITION BITS | | PULSE POSITION |
|---|---|---|
| 7 | 6 | |
| 0 | 0 | CENTERED PULSE |
| 1 | 0 | LEFT-JUSTIFIED PULSE |
| 0 | 1 | RESERVED (NOT USED) |
| 1 | 1 | RIGHT-JUSTIFIED PULSE |

LASER IMAGING DEVICE INCLUDING A PULSE WIDTH MODULATOR SYSTEM

BACKGROUND

Pulse width modulators may be designed to convert a pulse code defined by a series of coded pulses into a digital wave shape, or a modulated output, comprising a series of pulses having varying durations and occurring at varying intervals. Pulse width modulators may be designed with a maximum operating frequency, but operate at a modulation frequency determined by a system clock input. Pulse codes may be generated by digital devices to control an analog output device, with the codes typically being binary, ternary, or n-ary.

A laser printer is one example of a device that may utilize a pulse width modulator. Laser printers may employ pulse width modulators to modulate video signals to drive a laser driver, with the pulse codes being generated by imaging hardware contained in the printer's formatter. However, modulation frequencies used by laser imaging hardware, and by other electronic devices as well, are ever-increasing and can exceed the maximum design frequencies of off-the-shelf pulse width modulators.

While pulse width modulators with higher maximum operating frequencies can be designed to meet these requirements, such designs can be costly and take time to develop and produce. Waiting for a higher frequency pulse width modulator to be developed can result in delays in the research, development, and testing of new equipment prototypes, and ultimately an increase in cost.

SUMMARY OF THE INVENTION

In one embodiment, the present invention provides a laser imaging device. The laser imaging device includes a laser driver and a pulse width modulator system. The pulse width modulator includes a first pulse width modulator having a first operating frequency and a second pulse width modulator having a second operating frequency, which provides to the laser driver a pulse width modulated output signal having a desired modulation frequency greater than the first and second operating frequencies.

DESCRIPTION OF THE PREFERRED EMBODIMENTS

In the following detailed description of the preferred embodiments, reference is made to the accompanying drawings which form a part hereof, and in which is shown by way of illustration specific embodiments which may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
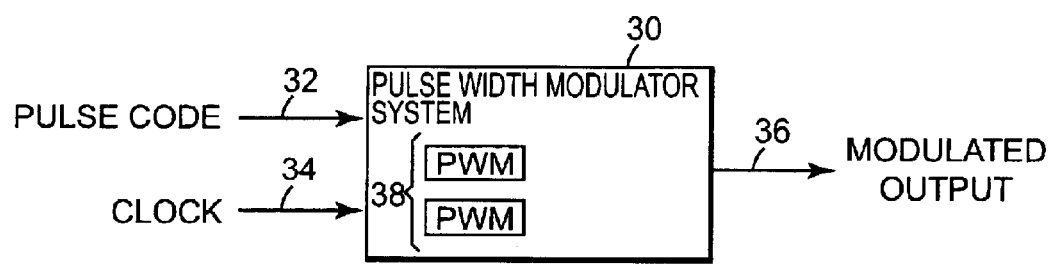
FIG. 1 is a block diagram of an exemplary embodiment of a pulse width modulator system.

FIG. 1 illustrates one exemplary embodiment of a pulse width modulator generally in block diagram form at 30. Pulse width modulator system (PWM) 30 receives a pulse code 32, defined by a series of coded pulses, and a clock signal 34, and converts the pulse code 32 into a modulated output 36 comprising a series of pulses at varying intervals and having varying durations, or pulse widths. In one aspect, pulse code 32 is in binary, ternary, or n-ary, and each coded pulse of pulse code 32 serves as an instruction as to how pulse width modulator system 30 is to construct the output pulse for a particular clock cycle period. Pulse width modulator system 30 is capable of producing relatively high maximum modulating frequencies using slower speed pulse width modulating devices 38. Pulse width modulator system 30 is suitable for use with an imaging device, and is described in detail in this application.

Figures 2A, 2B:
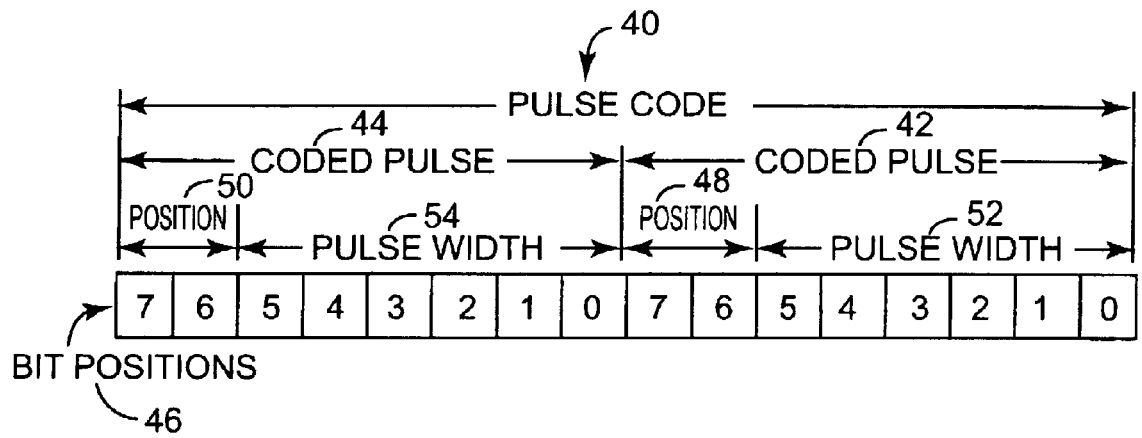
FIG. 2A is an illustrative diagram of an example pulse code configuration for a pulse width modulator system.
FIG. 2B is a illustrative table of position bit encoding of an example coded pulse of an example pulse code.

FIG. 2A is an illustrative diagram of an example pulse code 40 for pulse width modulator system 30. Pulse code 40 for PWM 30 is an 8-bit pulse code and comprises a series of 8-bit coded pulses such as coded pulse 42, and coded pulse 44. The 8-bits of coded pulses 42 and 44 are represented by bit positions 0 through 7 at 46. Bit positions 6 and 7 at 48 and 50 instruct PWM 30 as to whether the output pulse is to be left, right, or center-justified, while bit positions 0 through 5 at 52 and 54 are pulse width bits and instruct PWM 30 as to the width, or duration, of the output pulse.

FIG. 2B is a table illustrating an example of how bit positions 6 and 7 can be encoded to instruct PWM 30 as to the position of an output pulse. In the illustrative example, when bit positions 6 and 7 are both 0, as indicated at 62, the pulse is a centered pulse. When bit position 6 is a 0 and bit position 7 is a 1, as indicated at 64, the pulse position is left justified. The combination of a bit position 6 of 1 and a bit position 7 at 0, as indicated at 66, is not used and is reserved for a future instruction. When bit positions 6 and 7 are both set at 1, as indicated at 68, the pulse is a right-justified pulse.

Figure 3:
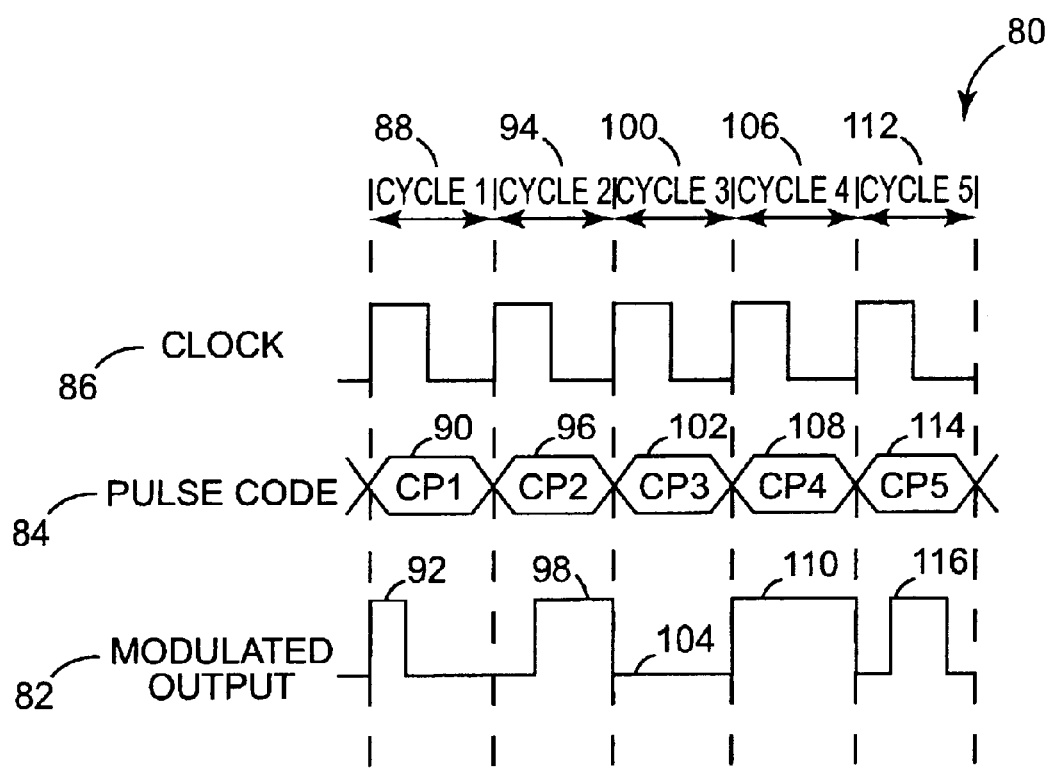
FIG. 3 is an illustrative timing diagram of an example modulated output provided by a pulse width modulator system in response to an example pulse code and clock signal.

FIG. 3 is an illustrative timing diagram 80 of an example modulated output 82 provided by PWM 30 of FIG. 1 for an example pulse code 84 at a modulation frequency indicated by clock 86. During clock cycle 1, indicated at 88, the first pulse code 90 instructs PWM 30 to provide a left-justified pulse 92. During clock cycle 2, indicated at 94, the second pulse code 96 instructs PWM 30 to provide a right-justified pulse 98. During cycle 3, indicated at 100, the third coded pulse 102 instructs PWM 30 to provide no output, as indicated at 104. During the fourth cycle, indicated at 106, the fourth coded pulse 108 instructs PWM 30 to provide a pulse for the duration of the clock cycle as indicated at 110. Finally, during the fifth cycle at 112, the fifth coded pulse 114 instructs PWM 30 to provide a center-justified pulse 116.

Figure 4:
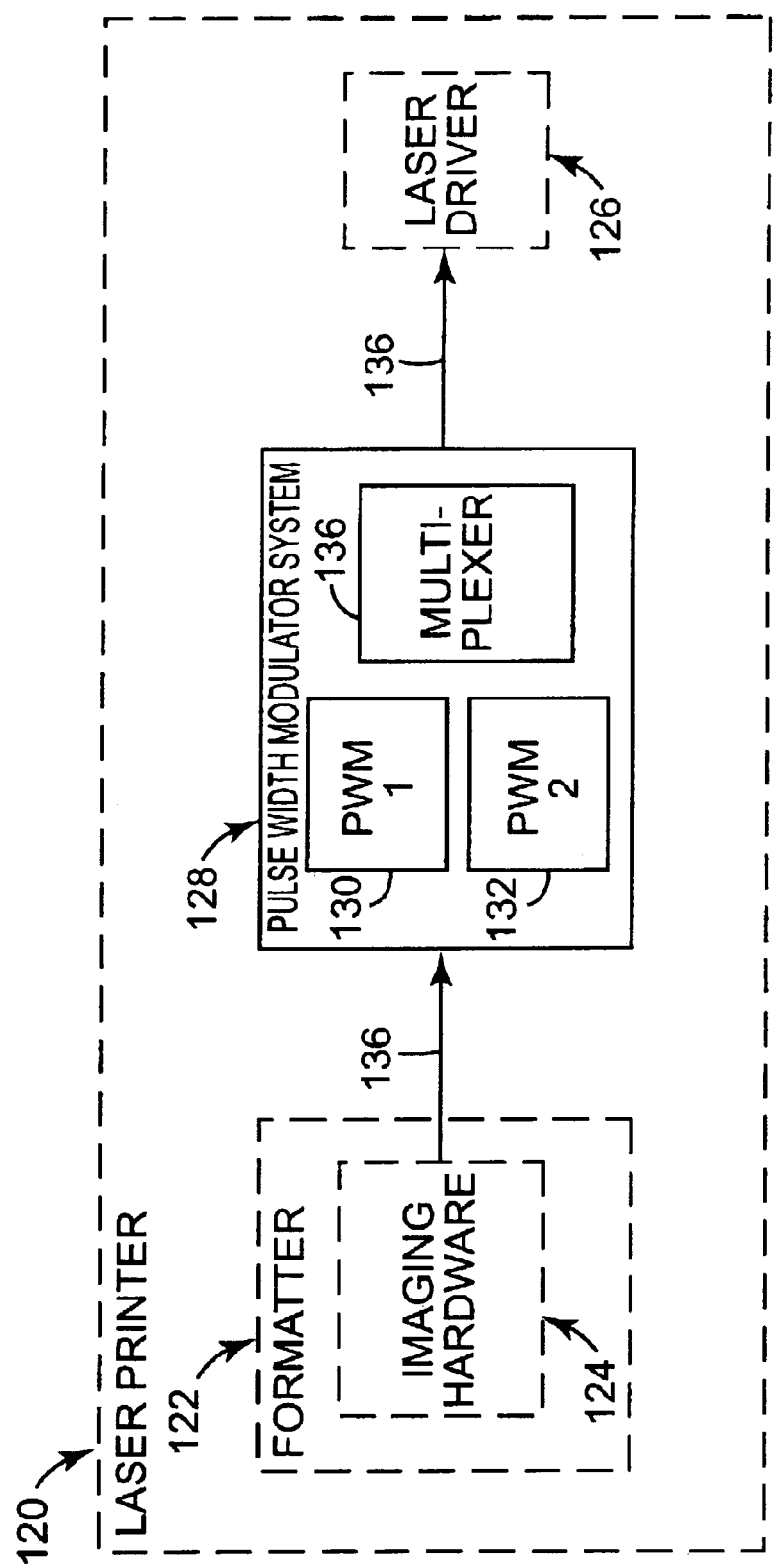
FIG. 4 is a block diagram illustrating one embodiment of a laser printer.

FIG. 4 is a block diagram illustrating one exemplary embodiment of a laser printer 120. Laser printer 120 includes a pulse width modulator system capable of producing high maximum modulating frequencies, where the pulse width modulator system is configured using slower speed pulse width modulating devices.

Laser printer 120 includes a formatter 122, including imaging hardware 124, a laser driver 126, and a pulse width modulator system 128. Pulse width modulator system 128 further includes a first pulse width modulator 130 (PWM 1), a second pulse width modulator 132 (PWM 2) and a multiplexer 134. Pulse width modulator system 128 is similar to pulse width modulator system 30 previously described herein.

Pulse width modulator system 128 is configured to receive a desired pulse code designed to operate at a desired modulation frequency from imaging hardware 124 via a line 136. PWM system 128 derives two pulse codes from the desired pulse code, with each designed to operate at a frequency that is less than the desired modulation frequency. PWM 1 provides a first modulated output based on the first derived pulse code, and PWM 2 provides a second modulated output based on the second derived pulse code. Multiplexer 134 selects between the first and second modulated outputs provided by PWM 1 and PWM 2 to provide a desired modulated output at the desired modulation frequency to laser driver 126 via a line 136.

Figure 5:
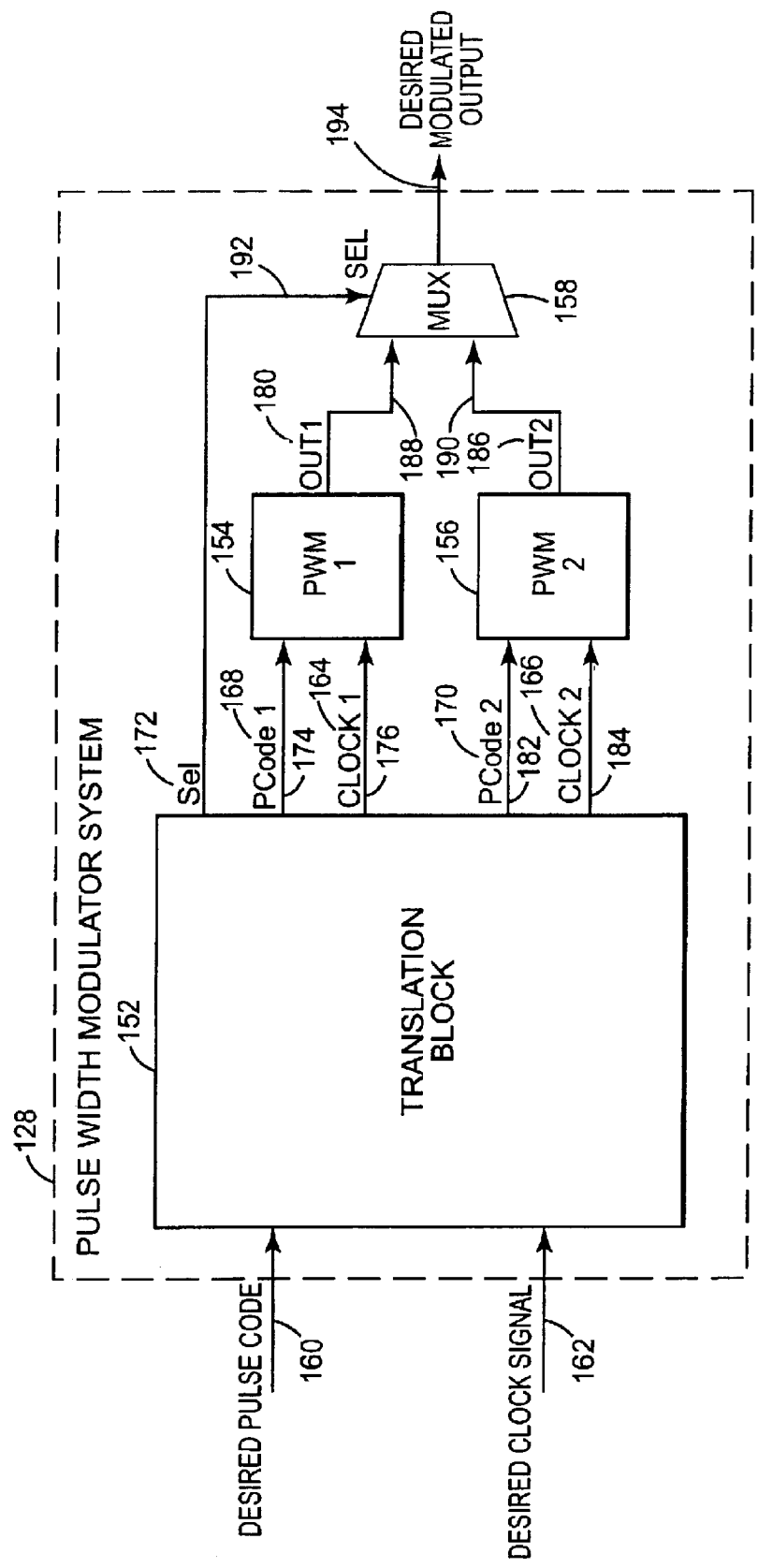
FIG. 5 is a block diagram illustrating one embodiment of a pulse width modulating system.

FIG. 5 is a block diagram illustrating in further detail one exemplary embodiment of a pulse width modulator (PWM) system 128. PWM system 128 includes a translation block 152, a first pulse width modulator 154, a second pulse width modulator 156, and a multiplexer 158. Translation block 152 is configured to receive a desired pulse code 160 and a desired clock signal 162 having a desired modulation frequency, with pulse code 160 designed to operate at the desired modulation frequency. Translation block 152 derives from clock signal 162 a first clock signal 164 having a first frequency and a second clock signal 166 having a second frequency, with the frequency of each being less than the desired modulation frequency of desired clock signal 162. Translation block 152 also provides a first pulse code 168 and a second pulse code 170 that are derivatives of pulse code 160, and are designed to operate at the frequencies of the first clock signal 164 and the second clock signal 166, respectively.

First PWM 154 receives first pulse code 168 via a line 174 and first clock signal 164 via a line 176, and provides a first modulated output 180 that is representative of the first pulse code 168 and at the first frequency. Second PWM 156 receives second pulse code 170 via a line 182 and second clock cycle 166 via a line 184, and provides a second modulated output 186 representative of the second pulse code 170 and at the second frequency.

Multiplexer 158 receives the first modulated output 180 via a line 188 and receives the second modulated output 186 via a line 190. Multiplexer 158 also receives a selector signal 172 having a selector frequency via a line 192 from translation block 152. Selector signal 192 drives multiplexer 158 to alternately select between the first modulated output 180 and the second modulated output 186 to provide at 194 a desired modulated output at the desired modulation frequency at 194.

In one embodiment, first clock signal 164 and second clock signal 166 each have a frequency substantially equal to one-half the desired modulation frequency of desired clock signal 162, and second clock signal 166 being substantially 180° out-of-phase with first clock signal 164. In one embodiment, first pulse code 168 comprises every other coded pulse of pulse code 160 beginning with the first coded pulse, and second pulse code 170 comprises every other coded pulse of pulse code 160 beginning with the second coded pulse.

Figure 6:
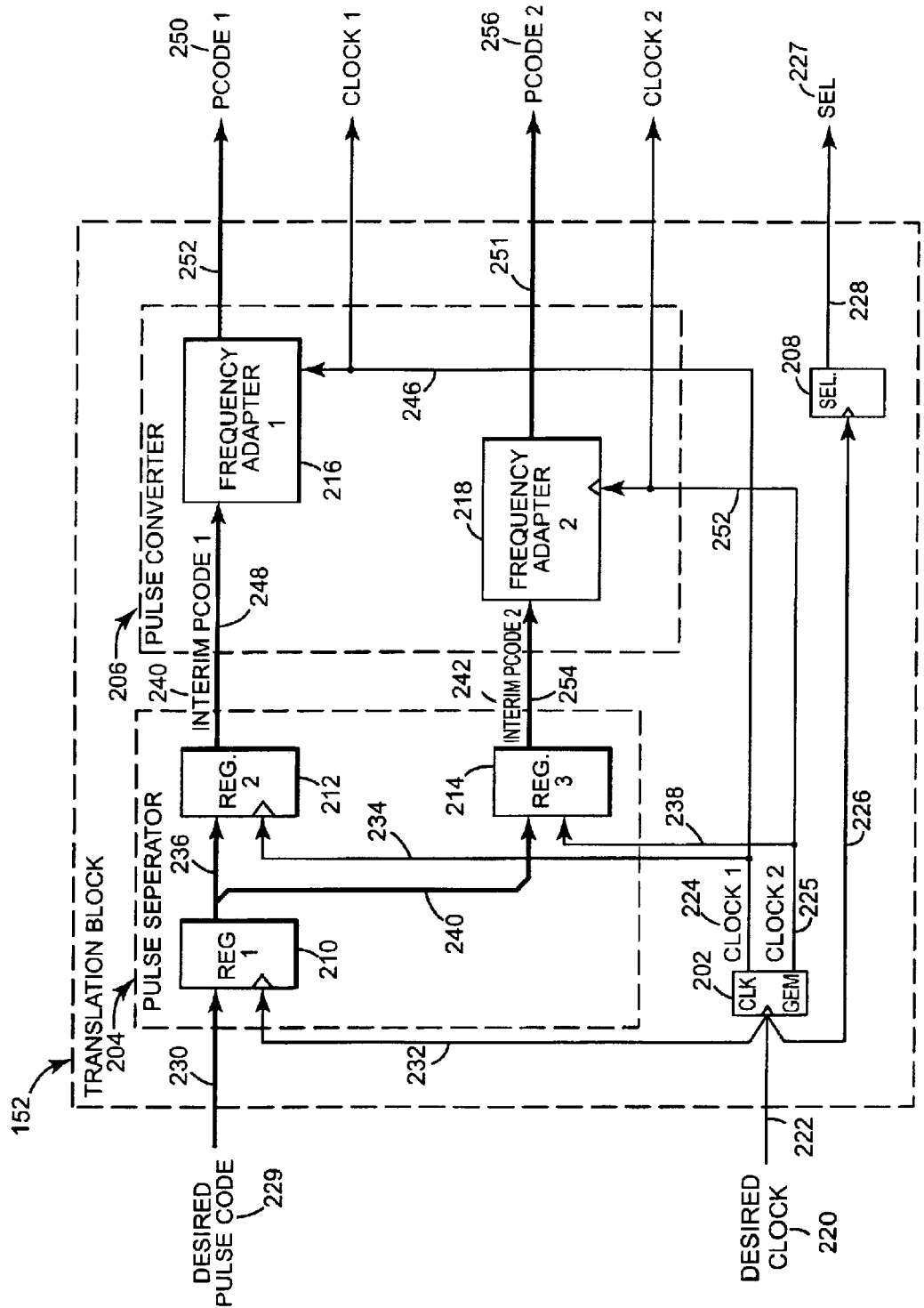
FIG. 6 is a block diagram illustrating one embodiment of a translation block of a pulse width modulating system.

FIG. 6 is a block diagram illustrating in further detail one exemplary embodiment of translation block 152. Translation block 152 includes a clock generator 202, a pulse separator 204, a pulse converter 206, and a selector signal generator 208. Pulse separator 204 further includes a first register 210, a second register 212, and a third register 214. Pulse converter 206 further includes a first frequency adapter 216 and a second frequency adapter 218.

Clock generator 202 receives a desired clock signal 220 having a desired modulation frequency via a line 222, and provides a first clock signal 224 having a first frequency and a second clock signal 225 having a second frequency. Selector signal generator 208 receives the desired clock signal 220 via a line 226 and provides a selector signal (SEL) 227 via a line 228.

First register 210 of pulse separator 204 receives a desired pulse code 229 comprising a series of coded pulses designed to operate at the desired modulation frequency via a line 230, and the desired clock signal 220 via a line 232. Second register 212 receives the first clock signal 224 via a line 234 and operates at the first frequency, and is coupled to the first register 210 via a line 236. Third register 214 receives the second clock signal 225 via a line 238 and operates at the second frequency, and is coupled to the first register 210 via a line 240.

In one embodiment, first clock signal 224 and second clock signal 225 are at substantially one-half the desired modulation frequency of desired clock signal 220, with second clock signal 225 being substantially 180° out-of-phase with first clock signal 224. By operating at one-half the desired modulation frequency and 180° out of phase with one another, second register 212 and third register 214 segregate the desired pulse code 229 into a first interim pulse code 240 and a second interim pulse code 242, respectively.

In one embodiment, first interim pulse code 240 comprises every other coded pulse of desired pulse code 229 beginning with the first coded pulse of the series, and second interim pulse code 242 comprises every other coded pulse of desired pulse code 229 beginning with the second coded pulse of the series. First interim pulse code 240 and the second interim pulse code 242 are designed to operate at the desired modulation frequency.

First frequency adaptor 216 receives first clock signal 224 via a line 246 and operates at the first frequency. First frequency adaptor 216 receives first interim pulse code 240 via a line 248. First frequency adaptor 216 modifies each coded pulse of first interim pulse code 240 to operate at the first frequency to thereby provide a first pulse code 250 via a line 252. Each coded pulse of first pulse code 250 provides substantially the same pulse width during the first half-cycle first clock signal 224 as would be provided by each coded pulse of first interim pulse code 240 during a full clock cycle of desired clock signal 220.

Second frequency adaptor 218 receives second clock signal 225 via a line 252 and operates at the second frequency. Second frequency adaptor 218 receives second interim pulse code 242 via a line 254. Second frequency adaptor 218 modifies each coded pulse of second interim pulse code 242 to operate at the second frequency to thereby provide a second pulse code 256 via a line 251. Each coded pulse of second pulse code 256 provides substantially the same pulse width during the first half-cycle of second clock signal 225 as would be provided by each coded pulse of second interim pulse code 242 during a full clock cycle of desired clock signal 220.

Figure 7:
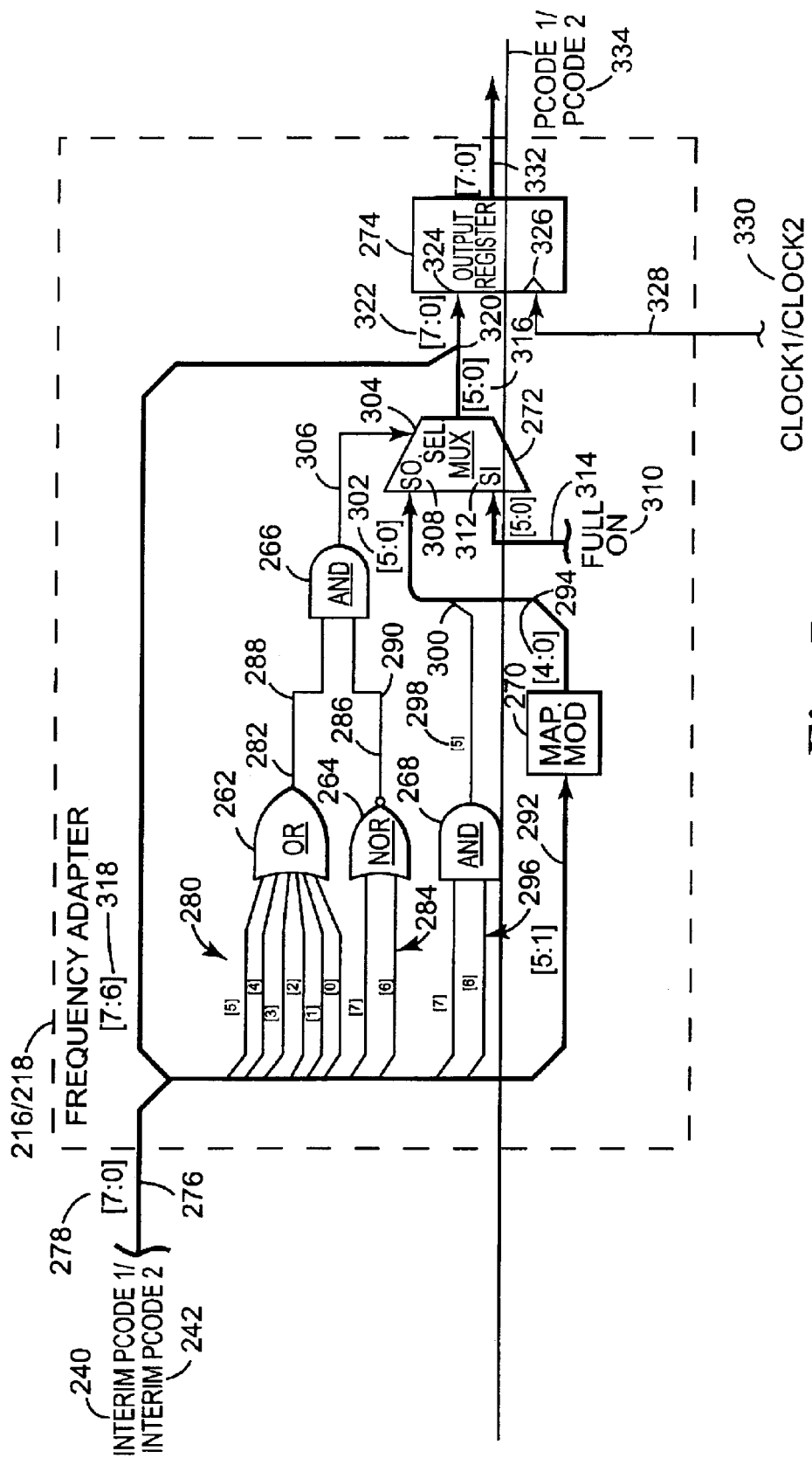
FIG. 7 is a block diagram illustrating one embodiment of a frequency adapter of a pulse width modulating system.

FIG. 7 is a block diagram illustrating in further detail one exemplary embodiment of frequency adaptor 216 or 218. Frequency adaptor 216/218 includes an OR gate 262, a NOR gate 264, a first AND gate 266, a second AND gate 268, a mapping module 270, a multiplexer 272, and an output register 274. Frequency adaptor 216/218 receives either first interim pulse code 240 or second interim pulse code 242 via a line 276. For illustrative purposes, frequency adaptor 216/218 is shown for use with a pulse code comprising 8-bit coded pulses as represented by bits 0 through 7 at 278, with bits 0 through 5 indicating the pulse width and bits 6 and 7 indicating the pulse position as previously illustrated in FIGS. 2A and 2B. OR gate 262 receives coded pulse bit positions 0 through 5 as inputs at 280 and provides an output at 282. NOR gate 264 receives bit positions 6 and 7 as inputs at 284 and provides an output at 286. AND gate 266 receives the output of OR gate 262 via a line 288, and the output of NOR gate 264 via a line 290.

Mapping module 270 receives bit positions one through five of coded pulse 278 via a line 292 and shifts them to bit positions zero through four, respectively, as indicated at 294. AND gate 268 receives bit positions six and seven as inputs at 296 and provides an output 298 that is utilized as bit position five. Bit positions zero through four 294 are combined with bit position five 298 to form pulse-width bits zero through five at 302.

Multiplexer 272 receives an output of AND gate 266 at a selector input 304 via a line 306. Multiplexer 272 receives pulse width bits zero through five 302 at a first input S0 308, and receives a five-bit "full-on" pulse code 310 at a second input S1 312 via a line 314. Multiplexer 272 selects between inputs S0 308 and S1 312 based on the status of selector input 304 to provide a five-bit pulse width output at 316.

The status of selector input 304 is determined as described below. If coded pulse 278 is a center-justified pulse and has a pulse width greater than zero, the output of AND gate 266 is set to "1" and instructs multiplexer 272 to select input S1 312. If coded pulse 278 is not center-justified or has a pulse width of "0," the output of AND gate 266 is set to "0" and instructs multiplexer 272 to select input S0 308. Bit positions six and seven of coded pulse 278, as indicated at 318, are combined with pulse width bits zero through five 316 at 320 to form an eight-bit coded pulse 322 having bit positions zero through seven.

Output register 274 receives coded pulse 322 at an input 324 and receives at an input 326 via a line 328 either the first or second clock signal 330, having a first and second frequency, respectively. Output register provides the eight-bit coded pulse 322 at either the first or second frequency at an output 332 to thereby provide either the first or second pulse codes 334.

Figure 8:
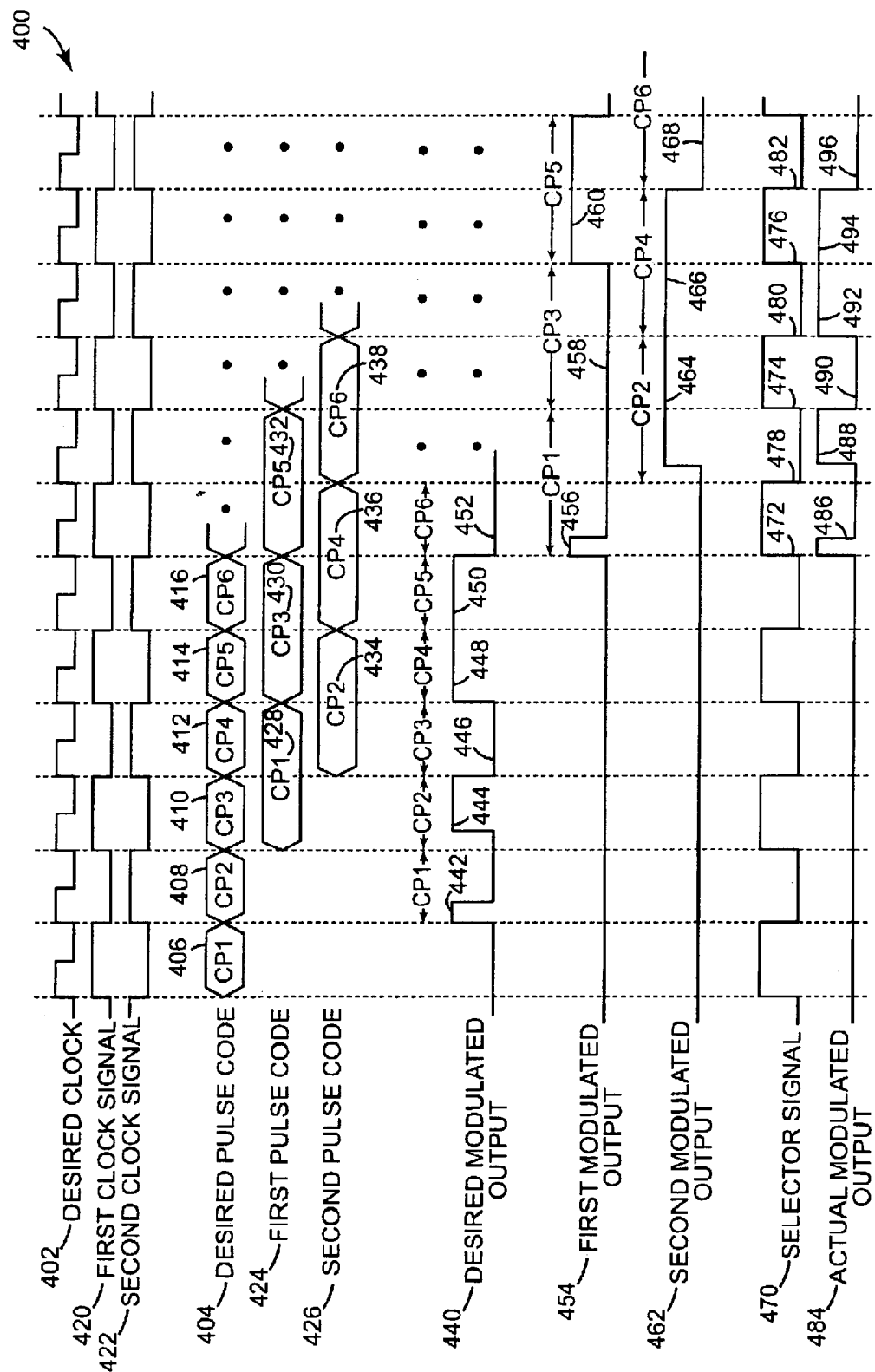
FIG. 8 is an example timing diagram illustrating the relationship between inputs and outputs of a pulse width modulating system.

FIG. 8 is an example timing diagram 400 illustrating the operation of pulse width modulator system 128 of FIG. 5. In the illustrative example, pulse width modulator 128 receives a desired clock signal 402 having a desired frequency and a desired pulse code 404 comprising a series of coded pulses CP1 through CP6 as indicated by 406 through 418, respectively.

Translation block 152 provides a first clock signal 420 and a second clock signal 422, with each clock signal at substantially one-half the desired frequency and second clock signal 422 being 180° out-of-phase with first clock signal 420. Translation block 152 also provides a first pulse code 424 and a second pulse code 426 that are derived from desired pulse code 404. First pulse code 424 comprises every other coded pulse of desired pulse code 404 beginning with the first coded pulse 406, with coded pulses 428, 430 and 432 being adapted to operate at the frequency of first clock signal 420. Second pulse code 426 comprises every other coded pulse of desired pulse code 404 beginning with the second coded pulse 408, with coded pulses 434, 436 and 438 being adapted to operate at the frequency of second clock signal 422.

Desired modulated output waveform 440 represents a desired modulated output that would be provided by a desired pulse width modulator capable of operating at the desired clock speed 402 and capable of receiving desired pulse code 404, is such a high frequency pulse width modulator was available. First coded pulse 406 would produce a left-justified pulse having a width as indicated at 442. Second coded pulse 408 would produce a right-justified pulse having a width as indicated at 444. Third coded pulse 410 would produce a pulse that is "full-off" for an entire cycle of desired clock 402 as indicated at 446. Fourth and fifth coded pulses 412 and 414 would produce pulses that are "full-on" for the entire cycle of desired clock 402 as indicated at 448 and 450, respectively. Lastly, sixth coded pulse 416 would produce a pulse that is "full-off" for the entire cycle of desired clock 402 as indicated at 452.

First modulated output waveform 454 represents the modulated output provided by first pulse width modulator 154 of pulse width modulator system 128 based on receiving first clock signal 420 and first pulse code 424. First coded pulse 428 produces a left-justified pulse having a width as indicated at 456. Third coded pulse 430 produces a pulse that is "full-off" for the entire cycle of first clock signal 420 as indicated at 458. Fifth coded pulse 438 produces a pulse that is "full-on" for the entire cycle of first clock signal 420 as indicated at 460.

Second modulated output waveform 462 represents the modulated output provided by second pulse width modulator 156 of pulse width modulator system 128 based on receiving second clock signal 422 and second pulse code 426. Second coded pulse 434 produces a right-justified pulse having a width as indicated at 464. Fourth coded pulse 436 produces a pulse that is "full-on" for the entire cycle of second clock signal 422 as indicated at 466. Lastly, sixth coded pulse 438 produces a pulse that is "full-off" for the entire cycle of second clock signal 422 as indicated at 468.

Multiplexer 158 of pulse width modulator system 128 receives first and second modulated outputs 454 and 462 and alternately selects between them based on a selector signal waveform 470 provided by translation block 152. On the rising edges of selector signal waveform 470, as indicated at 472, 474, and 476, multiplexer 158 selects first modulated output waveform 454, and on the falling edges of selector signal waveform 470, as indicated at 478, 480 and 482, multiplexer 158 selects second modulated output waveform 462 to thereby produce actual modulated output waveform 484. Actual modulated output waveform 484 is substantially equal to desired modulated output waveform 440, with a output pulses 486, 488, 490, 492, 494 and 496 being substantially equal to output pulses 442, 444, 446, 448, 450 and 452, respectively.

Pulse width modulator system 128 provides high speed pulse width modulation using slower speed pulse width modulation devices. By using currently available slower speed pulse width modulation devices, pulse width modulator system 128 can provide high speed modulation in situations where a single high speed pulse width modulation device is not yet available. This characteristic can be helpful in the development of prototype equipment requiring modulation speeds not currently available from a single pulse width modulation device in that research and testing can continue moving forward while such a high speed pulse width modulation device is developed. Pulse width modulator system 128 can reduce delays, reduce costs, and speed the development of new devices, including laser printers requiring high speed video signal modulation for laser drivers.

Although the operation of embodiments of the pulse width modulator system has been described with reference to certain specific embodiments, those skilled in the art will recognize that changes may be made in the form and detail of those specific embodiments without departing from the spirit and scope of the invention. Other aspects of the pulse width modulator system will be apparent to those of ordinary skill upon reading this disclosure.

What is claimed is:

1. A laser imaging device comprising:
    a laser driver; and
    a pulse width modulator system including:
        a translation block including a pulse separator configured to derive a first pulse code and a second pulse code from a desired pulse code; and
        a first pulse width modulator configured to receive the first pulse code adapted to operate at a first operating frequency and a second pulse width modulator configured to receive the second pulse code adapted to operate at a second operating frequency, wherein the pulse width modulator system provides to the laser driver a pulse width modulated output signal having a desired modulation frequency greater than the first and second operating frequencies.

2. The laser imaging device of claim 1, wherein the pulse width modulator system further comprises:
    a multiplexer configured to select between an output of the first pulse width modulator and an output of the second pulse width modulator to thereby provide the pulse width modulated output signal.

3. A laser imaging device comprising:
    a laser driver; and
    a pulse width modulator system including:
        a first pulse width modulator having a first operating frequency;
        a second pulse width modulator having a second operating frequency; and
        a translation block configured to receive a desired clock signal having a desired modulation frequency, to receive a desired pulse code comprising a series of coded pulses adapted to operate at the desired modulation frequency, configured to provide to the first pulse width modulator a first clock signal having the first operating frequency and a first pulse code adapted to operate at the first operating frequency, and to provide to the second pulse width modulator a second clock signal having the second operating frequency and a second pulse code adapted to operate at the second operating frequency, wherein the pulse width modulator provides to the laser driver a pulse width modulated output signal having the desired modulation frequency greater than the first and second operating frequencies.

4. The laser imaging device of claim 3, further comprising:
    a formatter configured to provide the desired pulse code, wherein the desired pulse code is representative of an image.

5. The laser imaging device of claim 3, wherein the first and second operating frequencies are substantially equal to one-half the desired modulation frequency.

6. The laser imaging device of claim 3, wherein the second clock signal is the inverse of the first clock signal.

7. The laser imaging device of claim 3, wherein the translation block further comprises:
    a clock generator configured to receive the desired clock signal and to provide the first and second clock signals;
    a pulse separator coupled to the clock generator, and configured to receive the desired clock signal, to receive the desired pulse code, and configured to provide a first and a second interim pulse code with each being a derivative of the desired pulse code and each adapted to operate at the desired modulation frequency; and
    a pulse converter coupled to the clock generator and to the pulse separator, and configured to receive the first and second clock signals, to receive the first and second interim pulse codes, and configured to adapt the first and second interim pulse codes to operate at the first and second operating frequencies, respectively, to thereby provide the first and second pulse codes.

8. The laser imaging device of claim 7, wherein the pulse separator comprises:
    a first register configured to receive the desired clock signal, to receive the series of coded pulses of the desired pulse code; and configured to provide the series of coded pulses at the desired modulation frequency;
    a second register coupled to the clock generator and to the first register, and configured to receive the first clock signal and to receive from the first register at the first frequency every other coded pulse of the series of the desired pulse code beginning with the first coded pulse to thereby provide the first interim pulse code; and
    a third register coupled to the clock generator and to the first register, and configured to receive the second clock signal and to receive from the first register at the second frequency every other coded pulse of the series of the desired pulse code beginning with the second coded pulse to thereby provide the second interim pulse code.

9. The laser imaging device of claim 7, wherein the pulse converter comprises:
    a first adapter circuit coupled to the pulse separator and to the clock generator, and configured to receive the first clock signal, to receive the first interim pulse code adapted for operation at the desired modulation frequency, and configured to perform an operation on the first interim pulse code to thereby provide the first pulse code adapted for operation at the first frequency; and
    a second adapter circuit coupled to the pulse separator and to the clock generator, and configured to receive the second clock signal, to receive the second interim pulse code adapted for operation at the desired modulation frequency, and configured to perform an operation on the second interim pulse code to thereby provide the second pulse code adapted for operation at the second frequency.

10. The laser imaging device of claim 9, wherein the first and second interim pulse codes each comprise a series of coded pulses with each coded pulse comprising a plurality of position bits and a plurality of pulse width bits, and the operation performed by the first and second adapter circuits on the first and second interim pulse codes, respectively, is to substantially divide by two the pulse width bits of each coded pulse.

11. The laser imaging device of claim 7, wherein the clock generator comprises a flip-flop.

12. A laser imaging device comprising:
   a laser driver;
   a pulse width modulator system including a first pulse width modulator having a first operating frequency and a second pulse width modulator having a second operating frequency, which provides to the laser driver a pulse width modulated output signal having a desired modulation frequency greater than the first and second operating frequencies;
   a multiplexer configured to select between an output of the first pulse width modulator and an output of the second pulse width modulator to thereby provide the pulse width output signal; and
   a selector signal generator configured to receive a desired clock signal having the desired modulation frequency and to provide to the multiplexer a selector signal at a selector frequency which instructs the multiplexer to select between the outputs of the first and second pulse width modulators.

13. The laser imaging device of claim 12, wherein the selector frequency is substantially equal to one-half the desired modulation frequency.

14. The laser imaging device of claim 12, wherein the selector signal generator is a flip-flop.

15. A pulse width modulator system for use with a laser driver, the system comprising:
   a pulse separator configured to derive a first pulse code adapted to operate at a first operating frequency and a second pulse code adapted to operate at a second operating frequency from a desired pulse code adapted to operate at a desired modulation frequency; and
   a first pulse width modulator configured to provide a first pulse width modulated output signal having the first operating frequency;
   a second pulse width modulator configured to provide a second pulse width modulated output signal having the second operating frequency; and
   a multiplexer which selects between the first and second pulse width modulated output signals to thereby provide to the laser driver a desired pulse width modulated output signal having the desired modulation frequency, wherein the desired modulation frequency is greater than the first and second operating frequencies.

16. The pulse width modulator system of claim 15, wherein the first and second operating frequencies are substantially equal to one-half the desired modulation frequency.

17. A pulse width modulator system for use with a laser driver, the system comprising:
   a first pulse width modulator having a first operating frequency and configured to provide a first pulse width modulated output signal having the first operating frequency;
   a second pulse width modulator having a second operating frequency and configured to provide a second pulse width modulated output signal having the second operating frequency;
   a multiplexer which selects between the first and second pulse width modulated output signals to thereby provide to the laser driver a desired pulse width modulated output signal having a desired modulation frequency greater than the first and second operating frequencies; and
   a translation block configured to receive a desired clock signal having the desired modulation frequency, to receive a desired pulse code comprising a series of coded pulses adapted to operate at the desired modulation frequency, configured to provide to the first pulse width modulator a first clock signal having the first operating frequency and a first pulse code adapted to operated at the first operating frequency, and to provide to the second pulse width modulator a second clock signal having the second operating frequency and a second pulse code adapted to operate at the second operating frequency.

18. The pulse width modulation system of claim 17, wherein the translation block receives the desired pulse code from imaging hardware on a printer formatter.

19. The pulse width modulator system of claim 17, wherein the second clock signal is the inverse of the first clock signal.

20. The pulse width modulator system of claim 17, wherein the translation block further comprises:
   a clock generator configured to receive the desired clock signal and to provide the first and second clock signals;
   a pulse separator coupled to the clock generator, and configured to receive the desired clock signal, to receive the first and second clock signals, to receive the desired pulse code, and configured to provide a first and a second interim pulse code with each being a derivative of the desired pulse code and adapted to operate at the desired modulation frequency; and
   a pulse converter coupled to the clock generator and to the pulse separator, and configured to receive the first and second clock signals, to receive the first and second interim pulse codes, and configured to adapt the first and second interim pulse codes to operate at the first and second frequencies, respectively, to thereby provide the first and second pulse codes.

21. The pulse width modulator system of claim 20, wherein the pulse separator comprises:
   a first register configured to receive the desired clock signal, to receive the series of coded pulses of the desired pulse code; and configured to provide the series of coded pulses at the desired modulation frequency;
   a second register coupled to the clock generator and to the first register, and configured to receive the first clock signal and to receive from the first register at the first frequency every other coded pulse of the series of the desired pulse code beginning with the first coded pulse to thereby provide the first interim pulse code; and
   a third register coupled to the clock generator and to the first register, and configured to receive the second clock signal and to receive from the first register at the second frequency every other coded pulse of the series of the desired pulse code beginning with the second coded pulse to thereby provide the second interim pulse code.

22. The pulse width modulator of claim 20, wherein the pulse converter comprises:
   a first adapter circuit coupled to the pulse separator and to the clock generator, and configured to receive the first clock signal, to receive the first interim pulse code adapted for operation at the desired modulation frequency, and configured to perform an operation on the first interim pulse code to thereby provide the first pulse code adapted for operation at the first frequency; and
   a second adapter circuit coupled to the pulse separator and to the clock generator, and configured to receive the second clock signal, to receive the second interim pulse code adapted for operation at the desired modulation frequency, and configured to perform an operation on the second interim pulse code to thereby provide the second pulse code adapted for operation at the second frequency.

23. The pulse width modulator of claim 22, wherein the first and second interim pulse codes each comprise a series of coded pulses with each coded pulse comprising a plurality of position bits and a plurality of pulse width bits, and the operation performed by the first and second adapter circuits on the first and second interim pulse codes, respectively, is to substantially divide by two the pulse width bits of each coded pulse.

24. The pulse width modulator system of claim 20, wherein the clock generator comprises a flip-flop.

25. A pulse width modulator system for use with a laser driver, the system comprising:
   a first pulse width modulator having a first operating frequency and configured to provide a first pulse width modulated output signal having the first operating frequency;
   a second pulse width modulator having a second operating frequency and configured to provide a second pulse width modulated output signal having the second operating frequency;
   a multiplexer which selects between the first and second pulse width modulated output signals to thereby provide to the laser driver a desired pulse width modulated output signal having a desired modulation frequency greater than the first and second operating frequencies; and
   a selector signal generator configured to receive a desired clock signal having the desired modulation frequency and to provide to the multiplexer a selector signal at a selector frequency which instructs the multiplexer how to select between the first and second pulse width modulated output signals.

26. The pulse width modulator of claim 25, wherein the selector frequency is substantially equal to one-half the desired modulation frequency.

27. The pulse width modulator system of claim 25, wherein the selector signal is substantially equal to the first clock signal.

28. The pulse width modulator of claim 25, wherein the selector signal generator is a flip-flop.

29. A method of providing a desired pulse waveform at a desired modulation frequency for modulating a laser driver, the method comprising:
   deriving from a desired pulse code adapted to operate at the desired modulation frequency a first pulse code adapted to operate at a first frequency and a second pulse code adapted to operate at a second frequency, wherein the first and second frequency are each less than the desired modulation frequency;
   receiving a first clock signal having the first frequency and the first pulse code at a first pulse width modulator to thereby provide a first pulse waveform at the first frequency;
   receiving a second clock signal having the second frequency and the second pulse at a second pulse width modulator to thereby provide a second pulse waveform at the second frequency;
   alternately selecting between the first and second pulse waveforms with a multiplexer at a selector frequency to thereby substantially provide the desired pulse waveform at the desired modulation frequency.

30. The method of claim 29, further comprising:
   providing first and second frequencies substantially equal to one-half the desired modulation frequency.

31. A method of providing a desired pulse waveform at a desired modulation frequency for modulating a laser driver, the method comprising:
   receiving a first clock signal having a first frequency and receiving a first pulse code adapted to operate at the first frequency at a first pulse width modulator to thereby provide a first pulse waveform at the first frequency;
   receiving a second clock signal having a second frequency and receiving a second pulse code adapted to operate at the second frequency at a second pulse width modulator to thereby provide a second pulse waveform at the second frequency;
   alternately selecting between the first and second pulse waveforms with a multiplexer at a selector frequency to thereby substantially provide the desired pulse waveform at the desired modulation frequency;
   receiving a desired clock signal having the desired modulation frequency;
   receiving a desired pulse code comprising a series of coded pulses adapted to operate at the desired modulation frequency;
   providing to the first pulse width modulator a first clock signal having the first frequency and a first pulse code adapted to operate at the first frequency; and
   providing to the second pulse width modulator a second clock signal having the second frequency and a second pulse code adapted to operate at the second frequency.

32. The method of claim 31, further comprising:
   inverting the first clock signal to thereby provide the second clock signal.

33. The method of claim 31, further comprising:
   deriving from the desired pulse code a first and a second interim pulse code each adapted to operate at the desired modulation frequency;
   adapting the first interim pulse code to operate at the first frequency to thereby provide the first pulse code; and
   adapting the second interim pulse code to operate at the second frequency to thereby provide the second pulse code.

34. The method of claim 33, further comprising
   providing the first interim pulse code by receiving at the first frequency every other coded pulse of the series of coded pulses of the desired pulse code beginning with the first coded pulse; and
   providing the second interim pulse code by receiving at the second frequency every other coded pulse of the series of coded pulses of the desired pulse code beginning with the second coded pulse.

35. The method of claim 33, wherein each coded pulse of the first and second interim pulse codes comprises a plurality of position bits and a plurality of width bits, and the method further comprises:
   dividing by substantially two the pulse width bits of each coded pulse of the first interim pulse code to thereby provide the first pulse code adapted for operation at the first frequency; and
   dividing by substantially two the pulse width bits of each coded pulse of the second interim pulse code to thereby provide the second pulse code adapted for operation at the second frequency.

36. The method of claim 31, further comprising:

selecting between the first and second pulse width modulated output signal at a frequency substantially equal to the desired modulation frequency.

37. A laser imaging device comprising:

a laser driver configured to modulate a laser at a desired modulation frequency based on a desired pulse waveform having the desired modulation frequency;

means for deriving from a desired pulse code adapted to operate at the desired modulation frequency a first pulse code adapted to operate at a first frequency and a second pulse code adapted to operate at a second frequency, wherein the first and second frequency are each less than the desired modulation frequency;

means for providing a first pulse waveform based on the first pulse code and having the first frequency;

means for providing a second pulse waveform based on the second pulse code and having the second frequency; and means for alternately selecting between the first and second waveforms at a selector frequency to thereby substantially provide the desired pulse waveform having the desired modulation frequency.

* * * * *